Figure 1:
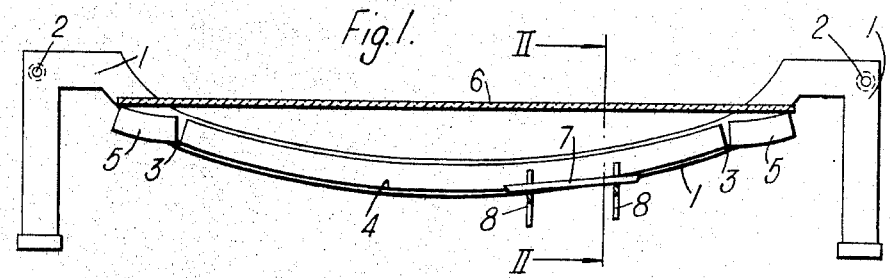

Dec. 7, 1965  H. F. HARPER ETAL  3,222,155
METHOD AND APPARATUS FOR THE PRODUCTION OF BENT TOUGHENED GLASS
Filed Sept. 19, 1961  3 Sheets-Sheet 1

Inventors
Harold Francis Harper
Bernard Wilfred Lee
Arthur Davies
By
Morrison, Kennedy & Campbell
Attorneys

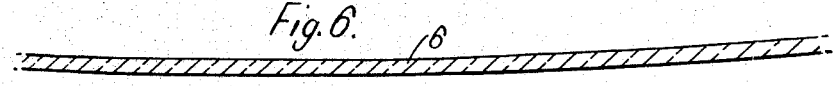
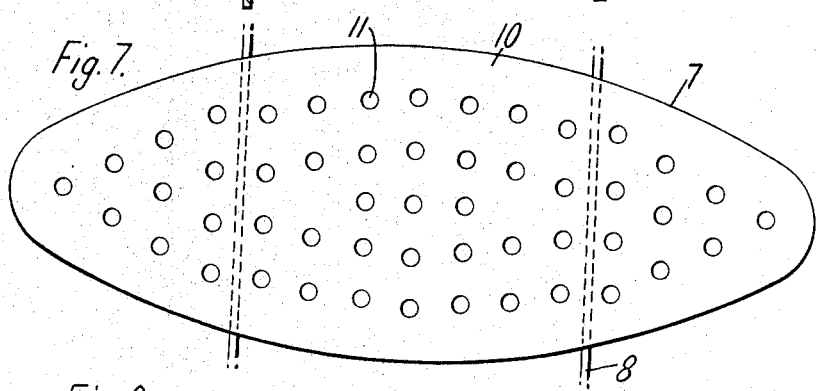
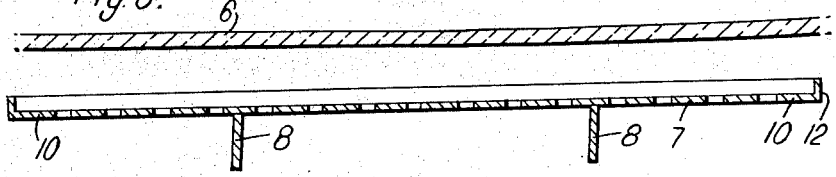
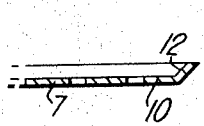
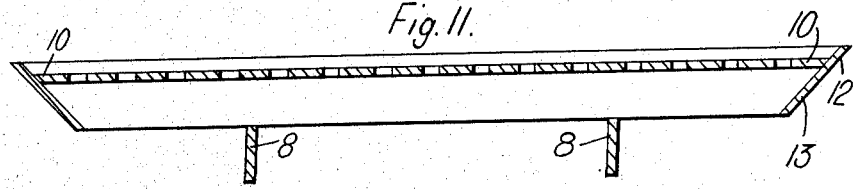
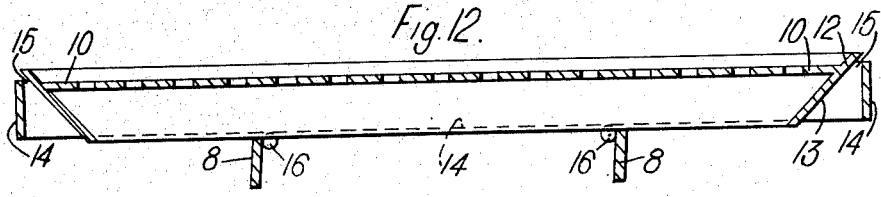

Dec. 7, 1965 H. F. HARPER ETAL 3,222,155
METHOD AND APPARATUS FOR THE PRODUCTION OF BENT TOUGHENED GLASS
Filed Sept. 19, 1961 3 Sheets-Sheet 3

Inventors
Harold Francis Harper
Bernard Wilfred Lee
Arthur Davies
By
Morrison, Kennedy & Campbell
Attorneys United States Patent Office 3,222,155
Patented Dec. 7, 1965

3,222,155
METHOD AND APPARATUS FOR THE PRODUCTION OF BENT TOUGHENED GLASS
Harold Francis Harper, Aughton Green, near Ormskirk, and Bernard Wilfred Lee and Arthur Davies, Eccleston, near St. Helens, England, assignors to Pilkington Brothers Limited, Liverpool, England, a corporation of Great Britain
Filed Sept. 19, 1961, Ser. No. 139,272
13 Claims. (Cl. 65—103)

This invention relates to the production of bent toughened glass.

A usual method of manufacturing bent glass such as toughened is to dispose a sheet of glass as a beam on a bending frame, the profile of which gives to the glass a desired curvature when the glass, supported on the frame, has been heated sufficiently to enable it to sag on to the frame. In the toughening process the frame with the bent sheet on it is passed on a cradle to a quenching unit where a quenching medium, usually compressed air, is directed to both faces of the sheet to rapidly chill the sheet and thus produce a curved toughened glass.

Such bent glass is supplied to the motor car industry and forms windscreens for motor vehicles and, by modern methods of manufacture, the windscreens have a sharp bend at each end and a gradual curvature in the middle area. These windscreens are sometimes referred to as "wrap round windscreens."

Accordingly in producing the desired curvature, a bending frame is articulated and includes end sections which have a sharp curvature and a middle section, which is of a gradual curvature, and in the sagging shape the end sections move upwardly into a position in continuation with the curvature of the middle section to give the desired continued curvature to the windscreen.

In order that the glass may bend itself by sagging into the different degrees of curvature a desired pattern of heat is imposed upon it, greater heat being imparted to those portions which are to become more sharply curved.

When a large quantity of toughened glass is required, it is customary to move the glasses on their bending frames on a succession of carriages with a uniform movement from the furnace and then between a series of stationary quenching units which series is arranged in end-on relationship to the furnace, the length of the series being such that the glass is quenched for a sufficiently long time for it to be properly toughened. Accordingly the series of quenching units, between which the glass passes is made to extend for a considerable length in the path of the glass from the furnace.

In the process of toughening a glass sheet, the degree of toughening achieved varies with the rate of chilling and a consequence of the quenching process is the formation in the glass of outer layers under compression which outer layers envelop glass in tension. Such a sheet of glass will disintegrate into small sections (termed dice) if the surface layer is fractured, and as a result there is sometimes a temporary and partial loss of vision from behind the windscreen, when fractured.

To meet this partial loss of vision, it has been proposed to produce a so-called "vision-zone" in which the dicing is of a greater size than in the ambient glass, for example, whereas the dicing in the ambient glass is of the order of 20 particles per square inch, the dicing in the vision zone is of the order of 5 to 10 particles per square inch and thus good vision is possible through the toughened glass windscreen though there has been a surface fracture.

The larger dicing in the vision area is produced by toughening the vision area to a lesser degree than that of the ambient glass.

The main object of the present invention is to provide improvements in the manufacture of toughened glass having vision zones by which the interval of time between the glass leaving the furnace and entering the quenching zone is kept at a minimum so that the maximum extent of chilling is obtained in the glass ambient to the vision zone and a further main object is to devise an improved method of producing large quantities of toughened glasses having vision zones and involving the use of a plurality of aligned quenching units associated with a glass softening furnace.

A method of producing bent toughened glass by heating the glass and permitting it to sag on to a frame to give the glass a predetermined bend and then quenching the conformed glass according to the present invention is characterised in that during the whole operation of heating and quenching, the underface of the glass, over a selected area intended to form a vision zone which is toughened to a less degree than the surrounding glass, is associated with an apertured sheet, the mass of the sheet and the spacing of the sheet from the glass being such that the presence of the sheet does not disturb the desired pattern of heating of the glass, and the obstruction to uniform quenching presented by the sheet is such as to modify in predetermined manner the degree of toughening of the glass in the area opposed to the sheet as compared with the degree of toughening effected by unobstructed quenching streams directed to the ambient glass.

Preferably, the method of producing bent toughened glass involves a total obstruction of the flow of the quenching medium to the glass along the margin of the apertured sheet in order to demark the configuration of the area of the glass intended to form the vision zone and having the modified degree of toughening.

The flow of the quenching medium passing towards the glass in contiguity with the margin of the apertured sheet is preferably controlled so as to minimize entry of the flow into the space between the sheet and the glass. To this end, the flow of the quenching medium passing towards the glass in contiguity with the margin of the apertured sheet is deflected outwardly from the periphery towards the glass to minimize entry of the flow into the space between the sheet and the glass.

The flow of the quenching medium passing towards the glass in contiguity with the whole margin of the apertured sheet may be concentrated in order to accentuate the demarcation of the configuration of the area of the glass having the modified degree of toughening.

The present invention comprises also apparatus for producing bent toughtned glass according to the methods hereinbefore described, such apparatus comprising a bending structure including a carriage and a bending frame for the glass mounted on the carriage, the bending frame being adapted, when the glass is heated, to permit the glass to bend to a predetermined shape, an apertured metal sheet including a continuous imperforate marginal area mounted on the bending structure and disposed so that it is in spaced relation with the glass when the glass has conformed to the shape of the frame, said perforated sheet underlying a selected area of the glass intended to form the vision zone, a furnace structure adapted to receive the bending structure and quenching frames between which the bent glass is moved on the supporting frame on leaving the furnace for the toughening operation.

The apertured sheet is preferably bounded by a rim directed towards the underface of the glass when the latter is disposed on the bending frame to restrain the ambient free flowing quenching air from entering the space between the sheet and the glass.

Preferably the rim of the apertured sheet is flared to increase the capacity of the rim to minimize entrance of the freely flowing quenching air into the space between the sheet and the glass.

The apertured sheet may be provided on the underface of the sheet with an inwardly flared flange to assist the flared rim in deflecting the ambient freely flowing air away from the space between the apertured sheet and the glass.

The flange on the underface of the apertured sheet may be constituted as a downward extension of the flared rim which rim is directed towards the glass.

Apparatus constructed according to the present invention may advantageously also comprise the combination with the apertured sheet of an imperforate fence surrounding the apertured sheet but in spaced relation with the marginal area whereby freely flowing air passing across the periphery of the sheet is concentrated and given a velocity increase to accentuate the demarcation of the vision zone of the glass.

The fence so provided may be near to the upwardly flared rim and a continuous air outlet thereby formed along the periphery of the apertured sheet and the inwardly flared flange emanating from the underface of the apertured sheet caused to direct the quenching air to the continuous outlet.

Preferably the inwardly flared rim is an extension of an upwardly flared rim on the sheet and the continuous outlet is constituted by a parallel upwardly flared flange mounted on the fence surrounding the rim on the apertured sheet.

The present invention comprehends the bent toughened sheet produced in accordance with the method of operation herein described, and comprising one or more areas, each toughened to a lesser degree than the ambient glass, the ambient glass being fully toughened.

Figure 2:
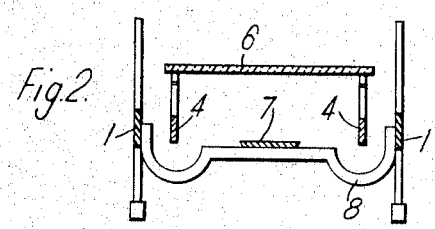
Figure 3:
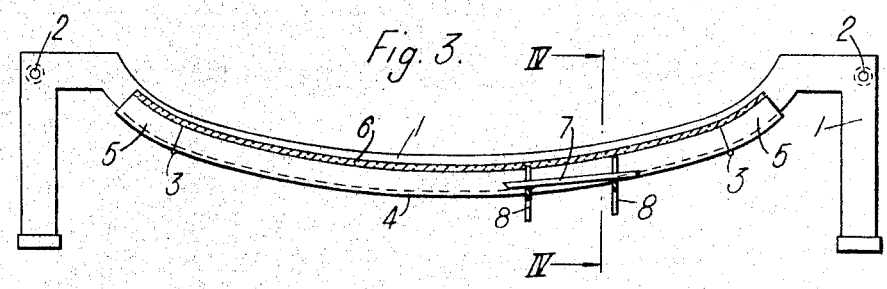
Figures 4, 5:
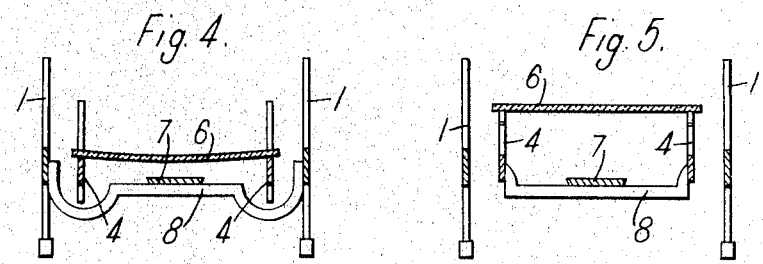
Figure 13:
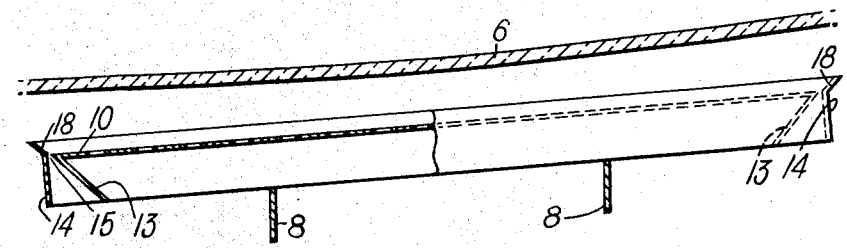
Figure 14:
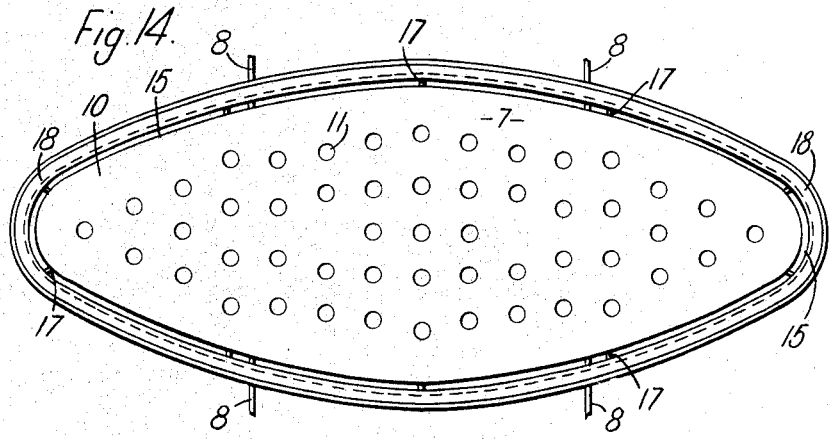
Figure 15:
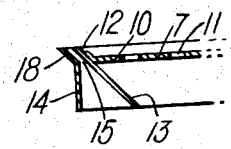
Figure 16:
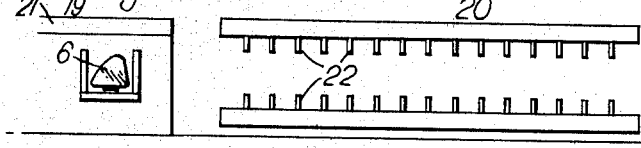

In order that the invention may be more clearly understood, some preferred embodiments will now be described by way of example, with reference to the accompanying diagrammatic drawings in which:

FIGURE 1 shows in elevation a glass bending structure comprising an articulated bending frame mounted on a carriage and a perforated sheet mounted on the carriage the frame being in the open position and the glass resting, as a beam, on the ends of the frame, FIGURE 2 is a simplified cross section on the line II—II of FIGURE 1, FIGURE 3 is a view similar to FIGURE 1 but showing the frame in closed position and the glass sagged to conform to the configuration of the closed frame after the heat treatment, FIGURE 4 is a simplified cross section on the line IV—IV of FIGURE 3, FIGURE 5 is a view similar to FIGURE 2 but illustrating a modification in which the mounting of the apertured sheet on the bending frame is shown, FIGURE 6 is a fragmentary side elevation showing an apertured sheet mounted on the bending frame and in FIGURE 7 is a plan of the apertured sheet, FIGURES 8 to 11 are views similar to FIGURE 6 showing modifications at the periphery of the apertured sheet, FIGURE 12 is a view similar to FIGURE 6 but showing a complemental force surrounding the apertured sheet providing a peripheral air outlet about the apertured sheet, FIGURE 13 is another view similar to FIGURE 6 showing a peripheral air outlet for the quenching air within the fence, and FIGURE 14 is a plan of the apertured sheet and FIGURE 15 shows in sectional elevation a modification of the sheet structure illustrated in FIGURES 13 and 14, and FIGURE 16 is a diagrammatic layout showing the association of a furnace with a quenching station comprising a series of quenching units in end to end relation.

In the drawings, like references designate the same or similar parts.

Referring first to FIGURES 1–7 of the accompanying drawings the glass bending structure includes a carriage comprising two similar side frames 1 which are connected at their ends by transverse elements indicated at 2—2 to form a rigid carriage, and between the side frames of the carriage is mounted, by links not shown but known in the art, a bending frame articulated at hinge pins indicated at 3. The articulated frame in the construction shown comprises a middle section 4 and two end sections 5. The middle section has a gradual curvature and the end section a sharp curvature as well known in the art.

In the open position of the bending frame, shown in FIGURE 1 a sheet of glass 6 which is to be toughened, rests as a beam on the end section 5 but as a result of the heat treatment, the glass sags on to the frame and conforms thereto as the end sections move, that is as the glass softens, in the manner well known in the art, and the glass eventually adopts the curvature of the frame in the closed form, which form is illustrated in FIGURE 3.

To one side of the middle area of the carriage, there is mounted in accordance with the invention, an apertured metal sheet 7 which, as clearly shown in FIGURES 6 and 7, is of an elliptical shape, in the circumstance that it is desired to produce in the glass an oval vision zone in the event of fracture of the glass when toughened. The apertured sheet is provided with transverse bars 8 which are welded to the sheet. The extremities of the bars 8 may be shaped as shown in FIGURE 4, to avoid contact with the sections 4, 4 of the bending frame, but to touch the side frames 1 of the carriage to which they are attached. Thus the sheet 7 is supported under the bending frame and therefore below the underface of the sheet.

In the alternative construction illustrated in FIGURE 5, the apertured sheet 7, instead of being mounted on the carriage, is mounted on the middle section of the bending frame, the bars 8 of the apertured sheet being welded to the underside of the middle section of the bending frame. Thus the sheet 7 is supported in spaced relation with the underface of the glass when it has conformed to the frame after heating. The apertured sheet used in accordance with the invention may be of metal or other material which can resist the temperature of the furnace within which the sheet is heated until it sags into conformation with the bending frame.

Preferably, however, the apertured sheet is formed of heat resisting steel in wafer form, the importance of which is that the presence of the sheet under the glass does not prevent or hinder the glass taking up the desired heating pattern which makes the glass conform to the bending frame or contributes to its doing so; accordingly the glass bends itself by sagging into the different degrees of curvature. A suitable thickness of the heat resisting steel is of the order of 0.025″.

As shown in FIGURE 6, except for a continuous marginal area, generally indicated at 10, the apertured sheet is perforated as clearly indicated at 11 in FIGURE 7, so that during the quenching of the glass 6, there will be a free flow of quenching air to the glass 6, except in the area thereof immediately above the sheet 7 where there will be a modified flow of quenching air to the glass.

Thus in the glass and corresponding to the configuration of the sheet 7 there will be an area of glass intended to constitute a vision zone which is toughened to a less degree than that of the ambient glass and though during the heating stage the desired pattern of heating of the whole of the glass is ensured by reason of the sheet 7 being incapable of absorbing heat to an extent which could prevent said pattern of heating, the apertured sheet exerts sufficient control during quenching to ensure the predetermined modification of the glass in the vision zone.

Apart from the incapacity of the sheet 7 to sensibly affect the desired pattern of heating of the glass, its spacing from the glass is chosen, by arranging the mounting on the underside of the carriage or bending frame as the case may be to be at such a distance under the glass, after the glass has been made to conform to the bending frame in closed position, as not to absorb heat therefrom whilst in the furnace.

Experiments have shown that when toughening bent ¼" plate glass, the apertures in the sheet are approximately ¼" in diameter and 1" apart and that a suitable distance for the apertured sheet from the bent glass is of the order of .75". As clearly illustrated in FIGURE 8, the apertured sheet 7 may be provided with a rim 12 directed towards the glass 6, the function of which is to restrain the ambient free flowing quenching medium from entering the space between the sheet 7 and the glass 6.

As indicated in FIGURE 9, the rim 12 may be flared to increase the capacity of the rim to minimize entrance of the freely flowing quenching medium into space between the sheet and the glass. A suitable angle of inclination of the rim 12 to sheet 7 has been found to be 45°.

Experiments have shown that the desired directing of the ambient freely flowing air away from the periphery of the apertured sheet 7 and towards the glass 6 can be achieved by an inwardly flared flange 13 emanating from the underface of the sheet as shown in FIGURE 10 instead of the rim 12 but preferably the flange 13 is constituted as indicated in FIGURE 11 as an extension below the sheet of the outwardly flared rim 12, the flange being of length about equal to three times the length of the rim 12.

As clearly shown in FIGURE 12, there may be used in combination with the apertured sheet 7 an imperforate fence 14 which may be used whether the apertured sheet has a flared rim 12 or only a flange 13, or where the flange 13 is constituted as an extension of the rim 12 as shown in FIGURE 12.

The fence is preferably formed of heat resisting steel to enable it to be welded to the apertured sheet as hereinafter described.

The effect of using the fence 14 is that freely flowing quenching medium is concentrated between the flange 13 and the fence 14 and is given an increased velocity as it emerges over the fence, the top of the fence being spaced with respect to the periphery of the apertured sheet so as to constitute a uniform outlet about the sheet 7, indicated at 15, for this concentrated flow of the ambient quenching medium which, as already indicated, is preferably air under pressure as normally used in the art of quenching heated glass to produce toughened glass.

The fence 14 may be separately mounted on transverse bars indicated at 16 in FIGURE 12 which bars are welded to the bars 8 carrying the apertured sheet 7 thus the outlet 15 is wholly continuous around the periphery of the apertured sheet.

In the arrangements shown in FIGURES 13 and 14, the fence 14 is connected to the periphery of the sheet 7 at suitable intervals by short struts 17. In the construction illustrated in FIGURES 13 and 14, the apertured sheet 7 is provided with a flange 13 emanating from its underface and instead of a rim 12, on the sheet, a flange 18 is provided on the fence 14.

In the structure disclosed in FIGURE 15, the apertured sheet is provided with a flange 13 constituted as an extension of the outwardly flared rim 12 on the sheet and the flange 18 on the fence 14 is parallel to the rim 12, thus the outlet 15 is extended towards the glass by the flared annulus between the rim 12 and the flange 18.

The arrangement of the thin metal apertured sheet 7 on a bending frame or a carriage on which the frame is supported provides a means of uniformly heating the glass without disturbing the heating pattern necessary to produce by sagging the desired curvature of the glass and of producing a modified zone in the glass in a localised area intended to form a vision zone, the glass in the vision zone being thus less toughened than the ambient glass.

Obviously more than one zone may be provided on one sheet of glass in accordance with the present invention but as already explained, the invention comprehends a method of manufacture and an apparatus for manufacturing which is particularly suitable for use when large quantities of toughened glass are required and which involve the use, as diagrammatically illustrated in FIGURE 16 of a furnace into which the loaded bending frame is pushed on its carriage and after the glass has been caused to conform to the shape prescribed by the bending frame, it is immediately transferred to a quenching station comprising a plurality of quenching units so that an extended quenching station is provided for sufficient length to enable the glass to be toughened as it is advanced through the quenching station and to remain subjected to the action of the quenching units for sufficiently long time for it to be properly toughened.

In FIGURE 16, the furnace is indicated at 19 and the quenching station at 20, the latter being disposed in end-on relationship with the furnace. The heaters of the furnace 19 are indicated at 21 and the quenching unit at the quenching station at 22. Thus a sheet of glass mounted on a bending structure comprising a bending frame and a carriage support therefor can be introduced into a furnace 19 and immediately on taking it from the furnace it is entered into the quenching station.

In such an arrangement, there may well be a plurality of carriages simultaneously passing through the quenching station, each carrying a screen to produce a modified quenching on the respective sheet of hot glass by arranging the screens sufficiently far away from the glass in the conformed condition, that is to say, spaced away a distance of the order of .75". Each screen is disposed so that it is ineffectual as a means of absorbing heat in amount sufficient to interfere with ensuring the desired pattern of heating, and so that it is sufficiently far away from the conformed glass for the slight variations in cross-curvature each occurring from glass to glass to be ineffectual in affecting the restriction it exerts on the quenching of the glass in the vision zone.

Accordingly, it will be appreciated that a rim 12 mounted on the apertured sheet 7, whether or not it is associated with a flange such as 13 on the underface of the apertured sheet, ensures the progressive development of the desired modified toughened zone in the glass though the assembly is being continually advanced in the quenching station, that it with respect to the quenching units during the quenching operation, the quenching air deflected towards the underface of the glass acting as a curtain or shield against the entry of the freely flowing quenching air approaching the glass in advance of the apertured sheet.

By manufacturing bent toughened glass in accordance with the present invention, the maximum degree of toughening is achieved for that part of the glass intended to be fully toughened, by reason of the fact that it is possible to commence the toughening and develop the vision zone immediately the glass leaves the furnace.

Moreover the apertured sheet which is used on the underside of the glass during the bending operation is of such a nature as to stand up to repeated heating and quenching operations. By the present invention, no step is required other than lifting the glass from the frame after the quenching operation to separate the glass from the apertured sheet, thus an operation of disconnecting screen, or removing a coating by stripping or washing the coating from the glass, is entirely avoided.

Further, the essential step of modifying the quenching over the vision zone is achieved without delay after leaving the furnace by the elimination of all operations such as are required to associate a screen with the glass after it has been heated and maximum toughening of the ambient glass is thereby achieved.

An apertured sheet constructed according to the present invention may be associated with a second adjacent sheet, both sheets having a low mass. Because of the low mass of the sheets, one of the sheets may be moved relatively to the other to adjust the cross-sectional area of the openings through which the quenching medium is directed, thus enabling an accurate degree of modified toughening to be effected in the vision zones. In such a construction, one of the sheets may carry a stud which passes through a longitudinal slot in the other and be provided with locking means, for example, a wingnut, to secure the desired relationship between the sheets.

Two sheets may be mutually arranged to graduate the cooling construction in the area of the vision zone or they may be so arranged as to modify the total area through which the quenching streams pass to that part of the glass destined to become a vision zone.

We claim:

1. A method of producing bent toughened glass comprising the steps of supporting a glass sheet horizontally on a frame having a curvature corresponding to the curvature which it is desired to produce in the toughened glass, placing in spaced relation to and below a selected area of the lower face of the glass sheet an apertured sheet made of such material and having a mass such that the apertured sheet is ineffective to the heating of the glass sheet, said apertured sheet presenting an obstruction to the flow of a quenching fluid towards the selected area of the glass sheet, and being sufficiently smaller in area than the glass sheet to leave regions of said glass sheet outwardly beyond the edge of the apertured sheet unobstructed, heating the glass sheet by heating means which are effective to obtain a desired heating pattern in the glass sheet unaffected by said apertured sheet, permitting the glass sheet to sag onto the frame and to assume thereby a desired curvature corresponding to the curvature of the frame, and directing towards both faces of the bent glass sheet a gaseous chilling medium to effect quenching of the glass sheet and to toughen thereby said glass sheet, the chilling medium directed against the lower face of the glass sheet being directed upwardly not only from below the apertured plate but also from the unobstructed regions outwardly beyond the edge of the apertured plate, the chilling medium directed against the lower face of the glass sheet in the selected area of the glass sheet passing upwardly through the apertures in said apertured sheet and impinging upon said lower face, to obtain a modified degree of toughening in the area of the glass sheet opposed to the apertured sheet as compared with the higher degree of toughening obtained in the ambient glass, the apertured sheet being present in said spaced relation to the selected area of the lower face of the glass sheet during the whole operation of the heating, bending and quenching the glass while the upper face of the glass sheet is free from any obstructions to the flow of quenching fluid towards said upper face during quenching that would interfere with the lifting of the toughened glass sheet from the frame after quenching.

2. Method of producing bent toughened glass according to claim 1, characterized by totally obstructing flow of the quenching medium to the glass along the margin of the apertured sheet to demark the configuration of the area of the glass having the modified degree of toughening.

3. Method of producing bent toughened glass according to claim 1, characterized in that the flow of the quenching medium passing towards the glass in contiguity with the margin of the apertured sheet is controlled to minimize entry of the flow into the space between the sheet and the glass.

4. Method of producing bent toughened glass according to claim 2, characterized in that the flow of the quenching medium passing towards the glass in contiguity with the whole margin of the apertured sheet is deflected outwardly from the periphery towards the glass to minimize entry of the flow into the space between the sheet and the glass.

5. Method of producing bent toughened glass according to claim 2, characterized in that the flow of the quenching medium passing towards the glass in contiguity with the margin of the apertured sheet is concentrated to accentuate the demarcation of the configuration of the area of the glass having the modified degree of toughening.

6. An apparatus for producing bent toughened glass comprising a bending structure including a carriage and a bending frame for the glass mounted on the carriage, the bending frame being adapted, when the glass is heated, to permit the glass to bend to a predetermined shape under gravity, an apertured quench-obstructing sheet of heat-resisting metal in wafer form including a continuous imperforate marginal area, means for mounting said obstructing sheet on the bending structure in spaced relation to and below the glass when the glass has conformed to the shape of the frame, said apertured sheet in mounted position underlying a selected area of the glass intended to form the vision zone in quenching position of the glass, while leaving regions of the glass outwardly beyond the edge of the glass unobstructed, a furnace structure adapted to receive the bending structure, and means for toughening the bent glass comprising upper and lower quenching frames between which the bent glass is adapted to be moved on the bending structure on leaving the furnace structure for the toughening operation, the lower quenching frame being located below the apertured plate in quenching position of the glass and having means for directing a quenching medium upwardly against the lower face of the bent glass, not only from below the apertured plate for upward passage through the apertures in said mounted apertured plate but also from unobstructed regions outwardly beyond the edge of the apertured plate, to obtain a modified degree of toughening in the area of the sheet opposed to the apertured sheet as compared with the degree of toughening in the unobstructed regions of the glass, said apparatus being free from any obstructions to the flow of quenching fluid towards the upper face of the glass that would interfere with the lifting of the toughened glass from the bending frame after quenching.

7. Apparatus for producing bent toughened glass according to claim 6, wherein the apertured sheet is bounded by a rim directed towards the underface of the glass when the latter is disposed on the bending frame to minimize entrance of the ambient free flowing quenching air into the space between the sheet and the glass.

8. Apparatus for producing bent toughened glass according to claim 7, wherein the rim of the apertured sheet is flared to increase the capacity of the rim to minimize entrance of the freely flowing quenching air into the space between the sheet and the glass.

9. Apparatus for producing bent toughened glass according to claim 8, wherein the apertured sheet is provided on the underface of the sheet with an inwardly flared flange to deflect the ambient freely flowing air away from the space between the apertured sheet and the glass.

10. Apparatus for producing bent toughened glass according to claim 9, wherein the flange on the underface of the apertured sheet is constituted as a downward extension of the flared rim which rim is directed towards the glass.

11. Apparatus for producing bent toughened glass according to claim 8, characterized by the combination with the apertured sheet of an imperforate fence surrounding the apertured sheet but in spaced relation with the marginal area to form a continuous outlet thereabout whereby freely flowing air passing across the periphery of the sheet is concentrated and given a velocity increase to accentuate the demarcation of the vision zone of the glass.

12. Apparatus for producing bent toughened glass according to claim 11, wherein the fence is near to the upwardly flared rim and a continuous air outlet is thereby formed along the periphery of the apertured sheet and an inwardly flared flange emanating from the underface of the apertured sheet caused to direct the quenching air to the continuous outlet.

13. Apparatus for producing bent toughened glass according to claim 12, wherein the inwardly flared flange is an extension of the upwardly flared rim on the sheet and the continuous outlet is constituted by a parallel upwardly flared flange mounted on the fence surrounding the rim on the apertured sheet.

References Cited by the Examiner

UNITED STATES PATENTS

| | | | |
|---|---|---|---|
| 2,897,632 | 8/1959 | Fowler et al. | 65—103 |
| 2,910,807 | 11/1959 | Chan et al. | 65—115 |
| 2,984,943 | 5/1961 | White | 65—107 |
| 3,069,878 | 12/1962 | Carson et al. | 65—107 |

DONALL H. SYLVESTER, *Primary Examiner.*